(12) United States Patent
Bennah et al.

(10) Patent No.: US 10,225,135 B2
(45) Date of Patent: Mar. 5, 2019

(54) PROVISION OF MANAGEMENT INFORMATION AND REQUESTS AMONG MANAGEMENT SERVERS WITHIN A COMPUTING NETWORK

(71) Applicant: International Business Machines Corporation, Armonk, NY (US)

(72) Inventors: Albert D. Bennah, Cary, NC (US); Jaymin S. Patel, Morrisville, NC (US); Kenny B. Yarboro, Roxboro, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 455 days.

(21) Appl. No.: 13/753,665

(22) Filed: Jan. 30, 2013

(65) Prior Publication Data

US 2014/0215037 A1    Jul. 31, 2014

(51) Int. Cl.
*H04L 12/24* (2006.01)

(52) U.S. Cl.
CPC ........ *H04L 41/042* (2013.01); *H04L 41/0695* (2013.01); *H04L 41/0856* (2013.01)

(58) Field of Classification Search
CPC ..................... H04L 12/2409; H04L 12/2419
See application file for complete search history.

(56) References Cited

U.S. PATENT DOCUMENTS

| | | | |
|---|---|---|---|
| 5,758,083 A * | 5/1998 | Singh et al. | 709/223 |
| 5,875,306 A | 2/1999 | Bereiter | |
| 6,112,239 A * | 8/2000 | Kenner et al. | 709/224 |
| 6,675,199 B1 * | 1/2004 | Mohammed | H04L 67/1002 709/208 |
| 6,795,858 B1 * | 9/2004 | Jain | H04L 67/1008 709/226 |
| 7,200,655 B2 | 4/2007 | Hunt et al. | |
| 7,490,142 B2 | 2/2009 | Kumar et al. | |
| 7,774,442 B2 | 8/2010 | Lees et al. | |
| 8,112,518 B2 | 2/2012 | Underhill | |
| 9,043,798 B2 * | 5/2015 | Calcaterra | G06F 9/5011 718/104 |
| 9,413,687 B2 * | 8/2016 | Jackson | G06F 9/5027 |
| 2003/0009558 A1 | 1/2003 | Ben-Yehezkel | |

(Continued)

OTHER PUBLICATIONS

Stage, A. and Setzer, T., Network-aware migration control and scheduling of differentiated virtual machine workloads, ICSE '09 Workshop, CLOUD '09, May 2009, Vancouver, CA, IEEE.

(Continued)

*Primary Examiner* — Tonia L Dollinger
*Assistant Examiner* — Albert Chiou
(74) *Attorney, Agent, or Firm* — Olive Law Group, PLLC

(57) ABSTRACT

Provision of management information and requests among management servers within a computing network are disclosed herein. According to an aspect, a method includes determining a requirement of a computing device that cannot be met by a first management server within a computing network. The method may also include communicating a request to a second management server within the computing network to assist with meeting the requirement of the computing device. Further, the method may include providing, to the second management server, access to management information associated with the computing device.

12 Claims, 4 Drawing Sheets

(56) References Cited

U.S. PATENT DOCUMENTS

| | | | |
|---|---|---|---|
| 2004/0122832 A1* | 6/2004 | Heil | H04L 67/1008 |
| 2005/0125503 A1* | 6/2005 | Iyengar et al. | 709/213 |
| 2005/0203915 A1 | 9/2005 | Zhu et al. | |
| 2007/0300215 A1* | 12/2007 | Bardsley | 717/168 |
| 2009/0094378 A1* | 4/2009 | Reus et al. | 709/235 |
| 2009/0119536 A1* | 5/2009 | Guo et al. | 714/4 |
| 2010/0318986 A1* | 12/2010 | Burke et al. | 717/176 |

OTHER PUBLICATIONS

Fletcher, D P., A Scalable, Out-of-Band Diagnostics Architecture for International Space Stations Systems Support, IEEEAC paper #1013, Updated Oct. 28, 2002, NASA Ames Research Center, Moffet Field, CA.

HOWTO55323, Setting up failover and load balancing, Created Jun. 26, 2011, Updated Aug. 22, 2012, web address: Httyp://www.symantec.com/business/supoprt/index?page=content&pmv=print&impressions=viewlocale=. . . last accessed Jan. 16, 2013.

Lupu, E.G., A Role-Based Framework for Distributed Systems Management, Imperial College of Science, Technology and Medicine, University of London, Dept. of Computing, Jul. 1998, pp. 1-2008.

Papazoglou, M.P. and Van Den Heuvel, W.J., Web Services Management: A Survey, IEEE Internet Computing, Nov.-Dec. 2005, pp. 58-64.

Post, M. et al., The Manager/Agency Paradigm for Distributed Network Management, IEEE, 1996, pp. 44-53.

\* cited by examiner

PROVISION OF MANAGEMENT INFORMATION AND REQUESTS AMONG MANAGEMENT SERVERS WITHIN A COMPUTING NETWORK

BACKGROUND

Field of the Invention

The present invention relates to computing networks, and more specifically, to provision of management information and requests among management servers within a computing network.

Description of Related Art

An enterprise computing network can include multiple servers, networks, and computing devices distributed over a wide geography. Within an organization, an enterprise computing network can connect isolated departmental or workgroup networks into an intracompany network. As a result, computer users within the organization can access some or all available data or computing resources.

As an example, an enterprise computing network may include a data center that implements centralized management of various computing devices or nodes. In many cases, highly specialized systems management software and tools are used to track, monitor, and configured various computer systems and their peripherals. A problem can occur when a management server managing a computing device or node cannot meet requirements of the computing device or node. For example, a computing device may be moved behind a firewall such that communication between the management server and the computing device is dropped. As a result, the management server can no longer perform its management tasks with respect to the computing device. For this and other reasons, it is desired to provide improved systems and techniques for meeting requires of computing devices being managed by management servers.

BRIEF SUMMARY

Provision of management information and requests among management servers within a computing network are disclosed herein. According to an aspect, a method includes determining a requirement of a computing device that cannot be met by a first management server within a computing network. The method may also include communicating a request to a second management server within the computing network to assist with meeting the requirement of the computing device. Further, the method may include providing, to the second management server, access to management information associated with the computing device.

According to another aspect, a method may be implemented at a management server managing a computing device within a computing network. The method may include conducting a management activity with the computing device. Further, the method may include determining performance information that is based on a performance of the computing device in response to the management activity. The method may also include providing the performance information to one or more other management servers within the computing network.

DETAILED DESCRIPTION

Exemplary systems and methods for provisioning management information and requests among management servers within a computing network in accordance with embodiments of the present invention are disclosed herein. Particularly, described herein is a system including multiple management servers that each manages one or more computing devices or nodes. The management servers and computing devices may be part of an enterprise computing network or other computing network. A management server may determine a requirement of a computing device that cannot be met by the management server. For example, the management server may determine that its communication connection with the computing device has failed. Thus, the management server cannot, at least for the time being, provide the computing device with management and control functionality such as configuration information. In response to determining that the requirement cannot be met, the management server may request that another management server assist with meeting the requirement of the computing device. In addition, access to management information for the computing device may be provided to management servers within the computing network. Continuing the aforementioned example, the other management server may be provided with a request for assistance, and may access management information for assuming responsibility for meeting the requirement of the computing device.

It is noted that systems and methods disclosed herein may be practiced in various embodiments. For example, systems and methods disclosed herein may be implemented with network communications devices, servers, or other computing devices comprising hardware, software, firmware, and combinations thereof.

Figure 1:
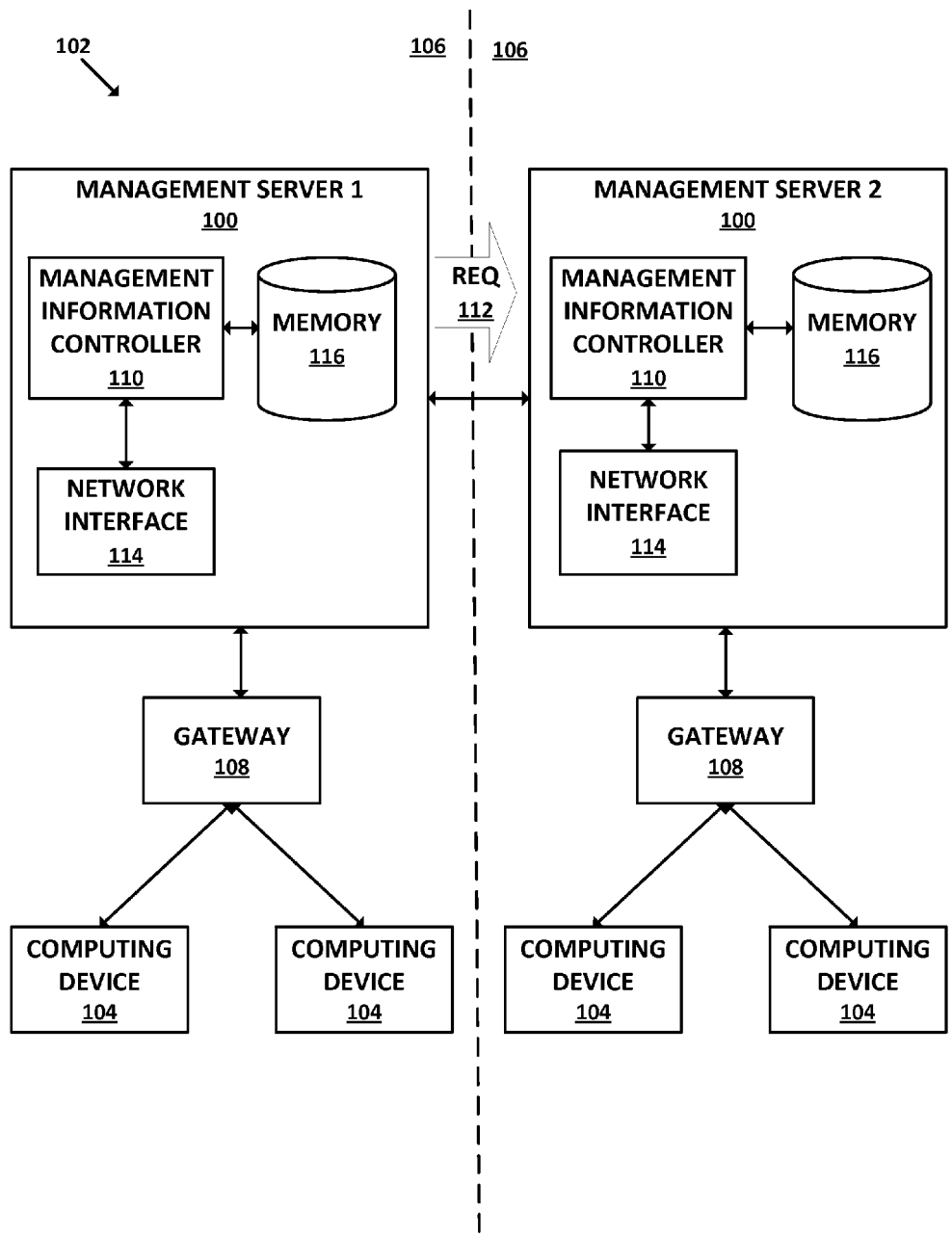
FIG. 1 is a block diagram of a system for provisioning management information and requests among management servers within an enterprise computing network in accordance with embodiments of the present invention.

FIG. 1 illustrates a block diagram of a system for provisioning management information and requests among management servers 100 within an enterprise computing network 102 in accordance with embodiments of the present invention. Referring to FIG. 1, the enterprise computing network 102 is implemented in a distributed computer environment that may include multiple computing devices 104 or nodes being managed by the management servers 100. The figure shows only a limited number of management servers 100 and computing devices 104 for purpose of simplification, although it should be understood that the network 102 may include other management servers and computing devices, as well as other computing components. Components of the network 102 may be geographically dispersed and managed in a distributed manner.

The managed environment may be logically separated into different managed regions 106, each with its own management server 100 for managing local resources within the managed region 106. The network 102 may include other servers for carrying out other network functions. For example, the network 102 may include security servers, file servers, threads servers, name servers, time servers, and the like. Multiple management servers 100 may coordinate activities across the network 102 and permit remote site management and operation. Each management server 100 may serve a gateway machine 108, which in turn can support respective computing devices 104. Each management server 100 may coordinate all activity within its respective managed region 106.

It is noted that single management server 100 may combined the functionality of a server and gateway. References herein to a distinct server and one or more gateways should thus not be taken by way of limitation these elements may be combined into a single platform. For various implementations, more than one management server and/or more than one gateway may be used to balance load of computing devices.

A management server 100 may be the top-level authority over all gateway and computing devices within its respective managed region. The management server may maintain a list of computing devices for keeping track of every computing device in a managed region. This list may contain information for uniquely identifying and managing computing devices including, but not limited to, name, location, machine type, specifications, and the like. The management server may maintain a mapping between a gateway and its computing devices. A gateway 108 may include functions such as, but not limited to, listening for login requests of computing devices, listening for upcall requests of computing devices, and acting as a gateway for invocations on computing devices. A management server and gateway may be any suitable computer running any suitable operating system.

A computing device 104 may be a computer such as a personal computer (e.g., a desktop computer or notebook computer). A computing device 104 may be added to the network 102 in any suitable manner and its information added to a list maintained by a respective management server 100.

Figure 2:
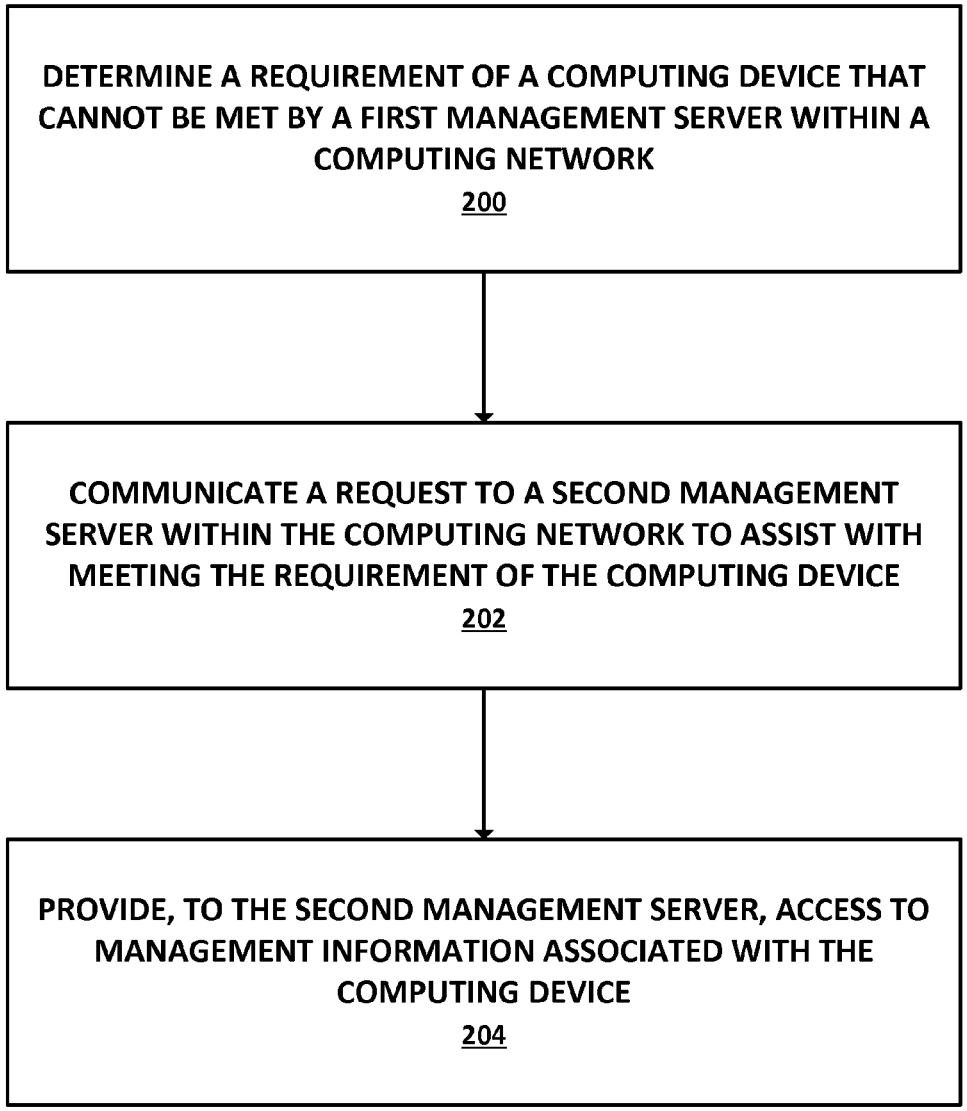
FIG. 2 is a flowchart of a method for provisioning management information and a request to a management server within a computing network in accordance with embodiments of the present invention.

In accordance with embodiments of the present invention, FIG. 2 illustrates a flowchart of a method for provisioning management information and a request to a management server within a computing network. The method of FIG. 2 is described as being implemented by the management server 1 100 shown in FIG. 1, although the method may be implemented by any suitable server, computing device, or combinations of components.

Referring to FIG. 2, the method includes determining 200 a requirement of a computing device that cannot be met by a first management server within a computing network. For example, the management servers 100 may each include a management information controller 110 configured to determine requirements of computing devices 104 within its managed region 106. The controller 110 may be implemented by software, firmware, or combinations thereof. For example, the controller 110 may be implemented by one or more processors and memory. The controller 110 may determine that a requirement of a computing device 104 based on, for example, but not limited to, determining one or more of the following: computing resources of the management server cannot meet a requirement of the computing device; a quality level of communication between the management server and the computing device does not meet a requirement of the computing device; and a workload associated with the computing device is projected to increase by a predetermined amount.

In accordance with embodiments of the present invention, a management server may determine that assistance for meeting requirements of a computing device are needed by accessing current or pending diagnostic faults. The diagnostic faults may indicate that the management server needs to go down for maintenance such as, but not limited to, software upgrade. In this case, the computing device may require management from another management server.

In accordance with embodiments of the present disclosure, a management server may require assistance with managing a computing device on the loss of network connectivity to a centralized firmware provisioning server. For example, the management server may be set up to monitor and ensure that the assets, such as the computing device, it manages are maintained with their latest firmware levels. The management server may download firmware from the firmware provisioning server. On the loss of connectivity to the firmware provisioning server, the management server may determine that the requirements of the computing device cannot be met, and in response thereto, the management server may request that another management server assume management of the computing device and its other assets.

The method of FIG. 2 includes communicating 202 a request to a second management server within the computing network to assist with meeting the requirement of the computing device. Continuing the aforementioned example, the controller 110 may communicate a request to another management server 100 to assist with meeting the requirement of the computing device 104. For example, the controller 110 may generate a request message 112 containing a computing device identifier, and control a network interface 114 to send the request message 112 to a peer management server 100 such as the server 100 designated "1" in FIG. 1. The request message 112 may also include management information for the computing device. The request message 112 may be sent via a suitable communications network such as the Internet or a local area network. In an example, request messages may be sent to multiple manager servers, such as via a suitable broadcasting technique.

The method of FIG. 2 includes providing 204, to the second management server, access to management information associated with the computing device. For example, management servers 100 shown in FIG. 1 and other peer management servers not shown in FIG. 1 may be communicatively connected in a communications network for share of management information associated with the management servers and corresponding computing devices. In an example, management information may reside in memory 116 of the management servers 100. A management server 100 may have access to management information stored in memory 116 of another management server. In this way, the database of management information for computing devices is stored in a distributed database. In a further example, management information for a computing device 104 may be stored in the computing device. In this example, a management server 100 may obtain management information of a computing device 104 directly from the computing device. In response to the request, the management server 100 may use the management information for meeting the requirement of the computing device.

Figure 3:
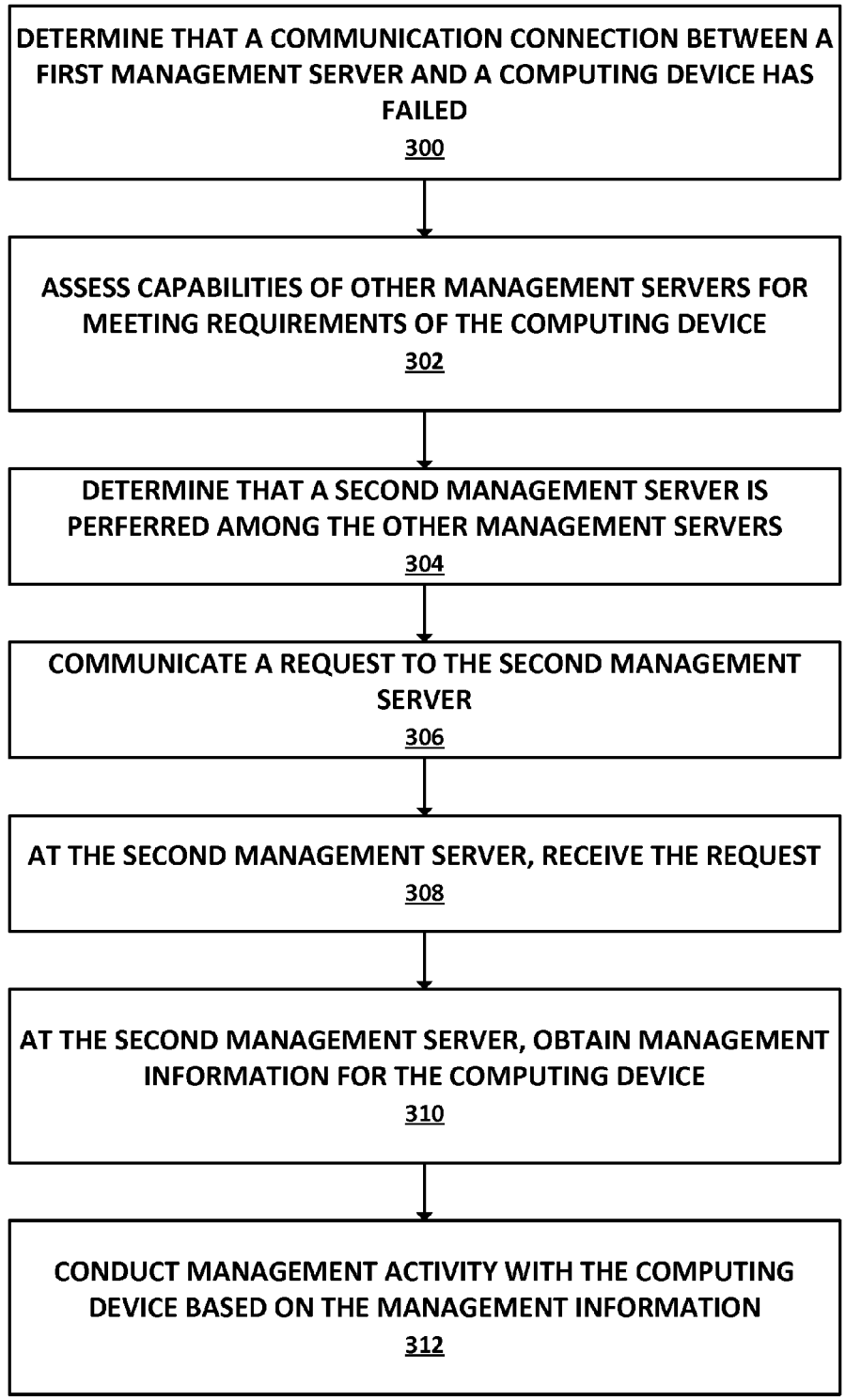
FIG. 3 is a flowchart of a method for requesting assistance to meet a requirement of a computing device in response to a communication connection failure in accordance with embodiments of the present invention.

FIG. 3 illustrates a flowchart of a method for requesting assistance to meet a requirement of a computing device in response to a communication connection failure in accordance with embodiments of the present invention. The method of FIG. 3 is described as being implemented by management server 1 100 and management server 2 100 shown in FIG. 1, although the method may be implemented by any other suitable server(s), computing device(s), or combination of components.

Referring to FIG. 3, the method includes determining 300 that a communication connection between a first management server and a computing device has failed. For example, the management server 1 100 shown in FIG. 1 may be unable to contact or discover one of the computing devices 104 within its managed region 106. The controller 110 may determine that the server cannot connect to the computing device. As a result, the management server 1 100 cannot, at least temporarily, meet requirements of the computing device 104 with which it cannot connect.

The method of FIG. 3 includes assessing 302 capabilities of other management servers for meeting the requirements of the computing device. Continuing the aforementioned example, the management server 1 100 may maintain or have access to a listing of other management servers within the network 102. In addition, the management server 1 100 may have access to information about the capabilities of the other management servers. For example, capability information of the other servers may include, but is not limited to, workload, uptime, physical proximity to the computing device, and the like. In the example of workload, a management server having a low workload may be preferred over another management server having a higher workload. In the example of uptime, one management server having a higher uptime than another management server may be preferred over the other server. In the example of physical proximity, a management server that is located closer to the computing device than another management server may be preferred over the other server. These factors for assessing other servers may be used alone or in combination and weighed differently for determining 304 a preferred management server among the other management servers. The controller 110 may implement the functions of capability assessment and determining a preferred server.

The method of FIG. 3 includes communicating 306 a request to the second management server to assist with meeting the requirement of the computing device. Continuing the aforementioned example, the management server 1 100 can send the request message 112. The method includes receiving 308 the request at the second management server. For example, the management server 2 100 may receive the request message 112 via a communications network.

The method of FIG. 3 includes obtaining 310, at the second management server, management information for the computing device. For example, management server 1 100 may store management information for the computing device in its memory 116. The management server 1 100 may communicate the management information to management server 2 100 via a communications network.

The method of FIG. 3 includes conducting 312 management activity with the computing device based on the management information. Continuing the aforementioned example, the management server 2 100 may assume in part or entirely the management activities that the management server 1 100 performed for the computing device 104. The management information can indicate the requirements of the computing device 104. The controller 110 of the management server 2 100 may interpret the requirements of the computing device 104 and may manage the computing device 104 to meet the requirements.

In accordance with embodiments, a management server may determine whether another management server can establish a communication connection with a computing device in response to determining that assistance is needed for meeting the computing device's requirements. For example, management server 1 100 may send a communication to management server 2 100 to query whether the management server 2 100 can establish a communication connection with the computing device 104. In response to determining that the management server 2 100 can establish the communication connection, the management server 1 100 can communicate a request to the management server 2 100 to meet the requirements of the computing device 104. Management server 1 100 may send queries and requests to other management servers if the query or request to management server 2 100 is unsuccessful.

Figure 4:
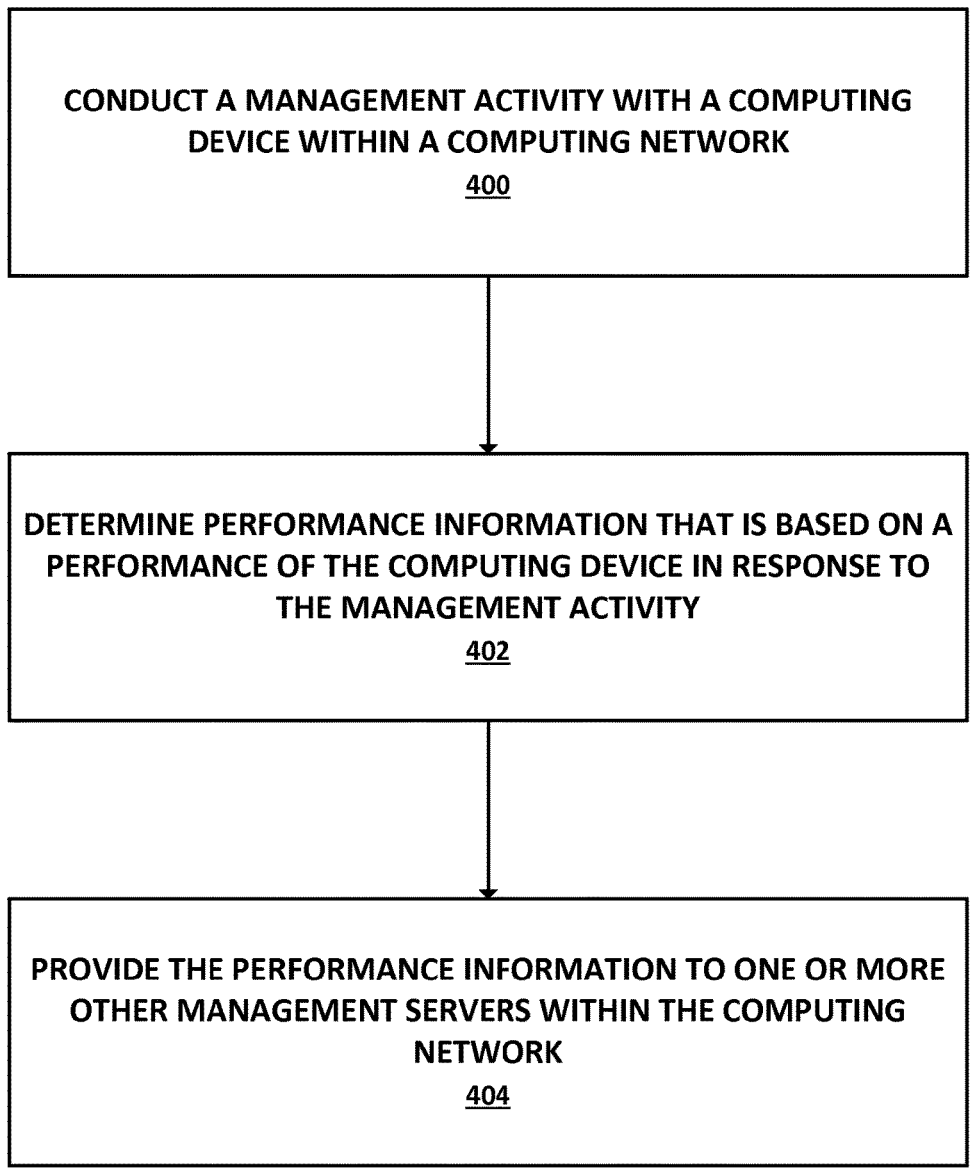
FIG. 4 illustrates a flowchart of a method for providing performance information of a computing device to one or more other management servers in accordance with embodiments of the present invention.

FIG. 4 illustrates a flowchart of a method for providing performance information of a computing device to one or more other management servers in accordance with embodiments of the present invention. The method of FIG. 4 is described as being implemented by management server 1 100 shown in FIG. 1, although the method may be implemented by any suitable server, computing device, or combination of components. In this example, management server 1 100 may be currently managing a computing device 104 within its managed region 106.

Referring to FIG. 4, the method includes conducting 400 a management activity with the computing device. For example, management server 1 100 may effect a change at one of the computing devices 104 within the managed region 106 of the management server 1 100. As an example, the management server 1 100 may implement a software update at the computing device 104.

The method of FIG. 4 includes determining 402 performance information that is based on a performance of the computing device in response to the management activity. Continuing the aforementioned example, the controller 110 may assess or determine a performance level of the computing device 104 in response to a change, such as a software update, effected at the computing device 104. The controller 110 may determine that the performance level of the computing device 104 decreased in response to the change. Thus, it can be concluded that it is undesirable to effect the change if the performance level of the computing device 104 decreases in response to it.

The method of FIG. 4 includes providing 404 the performance information to one or more other management servers within the computing network. Continuing the aforementioned example, management server 1 100 may provide performance information to management server 2 100 in response to determining that a performance level decreases. As an example, management server 1 100 may communicate to management server 2 100 information indicating that the performance level of the computing device 104 decreased in response to a software change or other change. The performance information may include identification of the management activity.

A management server receiving the performance information may analyze the information and use it for changing how it manages computing devices within its managed region 106. For example, the management server may prevent implementing an activity with its computing devices in response to determining that the activity decreases performance of a like computing device. As an example, in response to determining that performance decreases if an activity is implemented, the management server may prevent implementation of the change at its computing devices.

In accordance with embodiments of the present invention, a management server may determine that a specification of one of its managed computing devices is the same or similar to a specification of another computing device managed by another management server. In response to determining that an implemented management action decreases performance at the computing device, the management server may send performance information to the other management server. As a result, the recipient management server may prevent implementation of the activity with its computing devices having the same or similar specification.

In accordance with embodiments of the present invention, a computer network as described herein may be any suitable type of enterprise computing network. As an example, a computer network as disclosed herein may be part of a data center environment. The components of the network may communicate via any suitable communications network, such as the Internet or wireless network. Management servers may communicate via a separate and dedicated communications network. Further, management servers may communicate via a known protocol or a specialized protocol for handling communications among management servers for providing management information and sending requests in accordance with embodiments of the present disclosure.

In accordance with embodiments of the present invention, a management server may request assistance with its managed computing devices based on any reason that may affect management activities. For example, assistance may be requested in response to determining, but not limited to, diminished computing resources of the server, diminished network bandwidth or quality, projected increases in workload during peak times, the like, and combinations thereof. A management server may prioritize various tasks and request assistance based on priority of the tasks. For example, requests for help on higher priority tasks may be sent prior to lower priority tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    at a first management server that manages computing devices within a first management region of a computing network:
    determining a management requirement of a computing device within the first management region;
    determining, by the first management server, a performance level of the computing device based on a change in the computing activity of the computing device over time;
    determining, by the first management server, that the performance level of the computing device has decreased based on the change in computing activity of the computing device managed by the first management server;
    determining whether the first management server is unable to meet the management requirement of the computing device based on:
        a quality level of communication between the first management server and the computing device that is within the first management region; and
        the decreased performance level of the computing device, as managed by the first management server, that is within the first management region for processing a workload;
    in response to determining the first management server is unable to meet the management requirement of the computing device, determining whether a second management server that manages computing devices within a second management region of the computing network is able to establish a communication with the computing device within the first management region;
    in response to determining the second management server is able to establish a communication with the computing device within the first management region, assessing whether the second management server is able to meet the determined management requirement of the computing device within the first management region and determining that the performance of the computing device decreases when the computing activity is implemented; and
    in response to assessing whether the second management server is able to meet the determined management requirement of the computing device within the first management region and determining that the performance of the computing device decreases when the computing activity is implemented:
        communicating a request to the second management server within the computing network to assist with meeting the determined management requirement of the computing device of the first region, the request comprising an identification of the computing device and management information for meeting the determined management requirement for the computing device;
        and
        preventing implementation of the computing activity, at the second management server.

2. The method of claim 1, wherein determining whether the first management server is unable to meet the management requirement of the computing device comprises at least one of determining that a communication connection between the first management server and the computing device has failed.

3. The method of claim 1, wherein determining a management requirement of a computing device within the first management region comprises determining that one of: computing resources of the first management server is unable to meet a requirement of the computing device; a quality level of communication between the first management server and the computing device does not meet a requirement of the computing device; and a workload associated with the computing device is projected to increase by a predetermined amount.

4. The method of claim 1, further comprising:
assessing capabilities of management servers within the computing network for meeting the determined management requirement of the computing device; and
determining that the second management server can meet the determined management requirement of the computing device.

5. The method of claim 4, wherein assessing capabilities of the management servers comprises assessing one of workload, uptime, and physical proximity to the computing device.

6. The method of claim 1, further comprising:
assessing capabilities of management servers within the computing network for meeting the determined management requirement of the computing device; and
determining that the second management server is preferred among the management servers for meeting the determined management requirement of the computing device.

7. The method of claim 1, further comprising:
providing access to the management information for meeting the determined management requirement by maintaining a communications network among management servers within the computing network for share of the management information associated with the management servers and corresponding computing devices.

8. The method of claim 7, wherein providing access comprises storing the management information in a database accessible by the management servers within the computing network.

9. The method of claim 8, wherein the database is a distributed database.

10. The method of claim 7, wherein providing access comprises storing the management information at the computing device.

11. The method of claim 1, further comprising:
at the second management server:
receiving the request; and
in response to receiving the request, conducting management activity with the computing device based on the management information.

12. The method of claim 11, wherein conducting management activity comprises managing the computing device to meet the determined management requirement of the computing device.

* * * * *